United States Patent [19]

Cripps et al.

[11] 4,342,171
[45] Aug. 3, 1982

[54] FISH HOOK DISGORGER

[76] Inventors: Michael W. Cripps, Clay Croft, Bracken Rd.; Raymond Lee, 39 Fane Way, both of Maidenhead, Berks, England

[21] Appl. No.: 266,278

[22] Filed: May 22, 1981

[30] Foreign Application Priority Data

May 22, 1980 [GB] United Kingdom ............... 8016892

[51] Int. Cl.³ ............................................. A01K 97/00
[52] U.S. Cl. ..................................................... 43/53.5
[58] Field of Search ........................................ 43/53.5

[56] References Cited

U.S. PATENT DOCUMENTS

| 400,112 | 3/1889 | Post | 43/53.5 |
|---|---|---|---|
| 1,208,671 | 12/1916 | Severtsen et al. | 43/53.5 |
| 2,507,083 | 5/1950 | Anderson | 43/53.5 |
| 2,892,284 | 6/1959 | Shawhan | 43/53.5 |
| 3,011,286 | 12/1961 | Wallace | 43/53.5 |
| 3,721,034 | 3/1973 | Collins | 43/53.5 |
| 4,014,131 | 3/1977 | Bendik | 43/53.5 |

Primary Examiner—Jimmy C. Peters
Assistant Examiner—J. T. Zatarga
Attorney, Agent, or Firm—Jones, Tullar & Cooper

[57] ABSTRACT

A device for disgorging a hook attached to a line from a fish comprises a line encircler which is relatively movable with respect to a juxtaposed plunger, the forward end of which is adapted to bear against the fish in the proximity of the hook, retraction of the line encircler, relative to the plunger, causing the hook to be disgorged from the fish. The line encircler is preferably spring biased relative to the plunger. The device can be made of stainless steel or rigid plastics material so as to avoid contamination of the fish's flesh.

1 Claim, 2 Drawing Figures

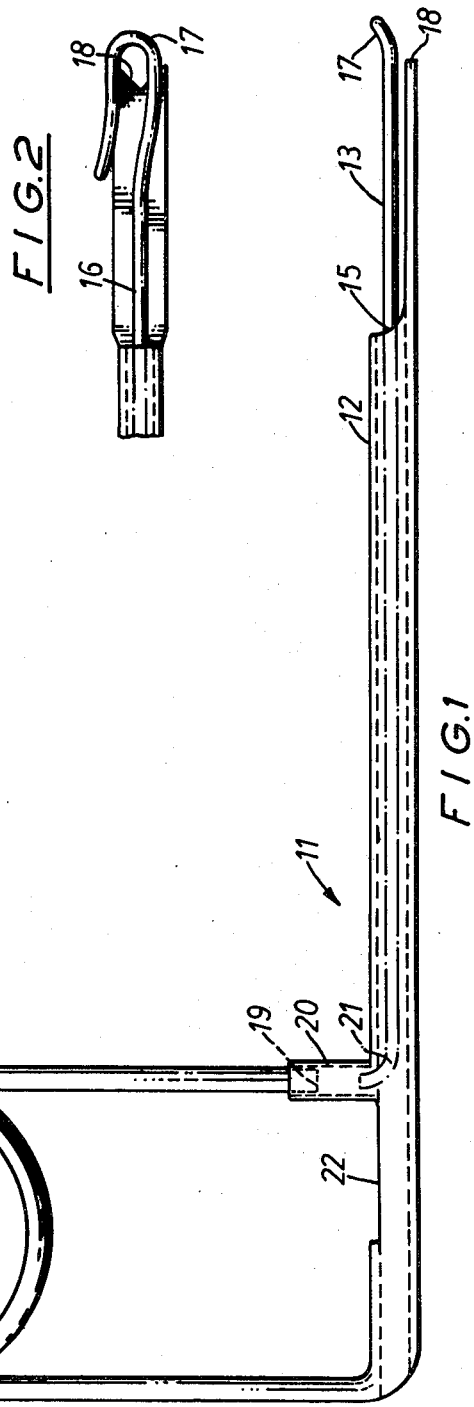
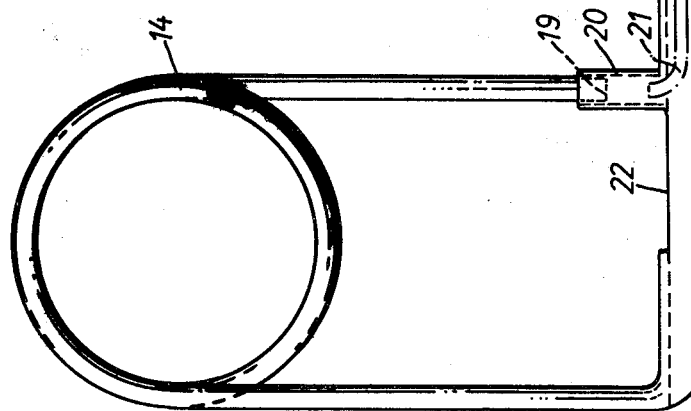

FISH HOOK DISGORGER

FIELD OF THE INVENTION

The present invention concerns a device for use by anglers to remove a hook and line from the throat of a fish.

DESCRIPTION OF THE PRIOR ART

Anglers always must remove a hook and line from the fish which they have caught, not only to recover their hook and line but also to be able to return the fish to the water without damage thereto.

To attempt to remove a hook from a wriggling fish is not always easy, especially if it is desirable to conserve the fish. Moreover, with a larger game fish an angler can be badly bitten in an attempt to remove the hook.

SUMMARY OF THE INVENTION

An object of the present invention is to provide a device for disgorging the hook from a fish.

According to the present invention a device for disgorging a hook attached to a line from a fish comprises a line encircler which is relatively movable with respect to a juxtaposed plunger, the forward end of which is adapted to bear against the fish in the proximity of the hook, retraction of the line encircler, relative to the plunger causing the hook to be disgorged from the fish. Preferably the line encircler is spring biased relative to the plunger in such a position that the forward end of the line encircler is ahead of the forward end of the plunger, means being provided to enable the line to be threaded between the line encircler and the plunger.

As it is desirable to provide a spring, this can preferably form the handle and thereby facilitate the disgorging action which can be effected with the use of only one hand. Alternatively, the spring can bias the line encircler forwardly relative to the plunger whereby retraction of the line encircler relative to the plunger by a lever disgorges the hook from the fish.

BRIEF DESCRIPTION OF THE DRAWINGS

The invention will now be described further, by way of example, with reference to the accompanying drawings, in which:

FIG. 1 is a side elevation of the fish disgorger in accordance with the invention; and FIG. 2 is a plan of the forward end of FIG. 1.

DESCRIPTION OF THE PREFERRED EMBODIMENTS

A disgorging device 11 comprises a tubular plunger 12 which houses a line encircler 13 made of heavy gauge wire. The line encircler 13 is biased forwardly relative to the plunger 12 by means of a spring 14 which simultaneously forms a handle. The front end of the plunger 12 is cut away at 15 to expose the forward end 16 of the line encircler 13 which is curved to form a hook 17. The tip 18 of the plunger is formed in the shape of a V. The spring 14 has one end 19 housed in a bush 20 secured to the rear end 21 of the line encircler 13. The other end of the spring 14 is secured to the rear end of the plunger 12. The bush or lever 20 is normally biased towards the forward end of the disgorger but can be moved backwardly in a slot 22 against the spring bias to move the line encircler 13 rearwardly relative to the plunger 12.

In operation the line (not shown) is threaded through the hook 17 and the whole front end of the device is thrust into the mouth of the fish. The line is then pulled until the end thereof with the hook bears in the V 18 of the plunger. The line encircler 13 is then retracted by rearward pressure on the lever 20 against the spring force which thereby releases the fish from the hook without any damage to the fish's throat.

We claim:

1. A fish hook disgorger for disgorging a fish hook and line from a fish, said fish hook disgorger comprising:

an elongated line encircler of heavy gauge wire, a forward end of said line encircler being curved to form a line encircling hook, a rear end of said line encircler terminating in a first end of a bush extending generally perpendicularly to said elongated line encircler;

a tubular plunger within which said line encircler is slideably housed, a front end of said tubular plunger being formed as a V-shaped plunger tip positioned adjacent said line encircling hook, an elongated slot formed in said tubular plunger away from said plunger tip, said bush extending through and being slideable in said slot; and a spring, a first end of said spring being secured in a second end of said bush and a second end of said spring being attached to a rear end of said plunger, said spring forming a handle portion of said fish hook disgorger and biasing said line encircler forwardly in said turbular plunger, whereby rearwood movement of said line encircling hook relative to said plunger tip against said spring bias disgorges the fish hook and line from the fish.

* * * * *